United States Patent [19]
Bhalla et al.

[11] Patent Number: 5,949,773
[45] Date of Patent: Sep. 7, 1999

[54] METHOD FOR TRANSFERRING A DATA SIGNAL IN A WIRELESS COMMUNICATIONS SYSTEM

[75] Inventors: Rajesh Bhalla, Elk Grove Village; Lewis J. Milton, Northfield, both of Ill.

[73] Assignee: Motorola, Inc., Schaumburg, Ill.

[21] Appl. No.: 09/052,380

[22] Filed: Mar. 31, 1998

[51] Int. Cl.⁶ .................................................... H04Q 7/38
[52] U.S. Cl. .......................... 370/331; 455/436; 455/439
[58] Field of Search .................................. 370/331–334; 455/436–444

[56] References Cited

PUBLICATIONS

K.K. Ho, "Architectural Design of a Code Division Multiple Access Cellular System", Vehicular Technology Conference, 1992, IEEE 42nd, pp. 47–50, vol. 1, May 1992.
TIA/EIA/IS–687, "Data Services Interworking Function Interface for Wideband Spread Spectrum Systems", undated.
TR45 IS–728, "Intersystem Link Protocol", Telecommunications Industry Association, 1997.
TR45 IS–634.1 "MSC–BS Interface for Public 800 Mhz: Functional Overview", Telecommunications Industry Association, 1995.
TR45 IS–707 "Data Service Options for Wideband Spread Spectrum Systems", Nov. 1997.

*Primary Examiner*—Melvin Marcelo
*Attorney, Agent, or Firm*—Sayed Hossain Beladi

[57] ABSTRACT

The method of transferring a CDMA data signal (107) associated with a mobile station (103) which operates between a source system (202) and a target system (204). The method includes establishing a frame relay switched virtual circuit (FR SVC) transport function capability in the source system (202) and, consequently generating a plurality of parameters. The method also includes determining that the mobile station (103) requires a transfer of the CDMA data signal (107) which results in forwarding a message from the source system to the target system to transfer the CDMA data signal (107), the message including the plurality of parameters. Based on the plurality of parameters, converting the CDMA data signal (107) into a FR SCV format by the target system (204), forming a frame relay data signal, which is routed via the target system (204) to an inter working function element (IWF)(214) of the source system (202).

20 Claims, 4 Drawing Sheets

METHOD FOR TRANSFERRING A DATA SIGNAL IN A WIRELESS COMMUNICATIONS SYSTEM

FIELD OF THE INVENTION

The present invention relates generally to communication systems and, more particularly, to a method for transferring a data signal in a wireless communication systems.

BACKGROUND OF THE INVENTION

Communication systems consisting of land mobile radio, cellular radiotelephone, personal communication system (PCS), and various other types are well known. One such multiple access wireless communication system is a direct sequence code division multiple access (DS-CDMA) cellular communication systems, such as set forth in the TIA Interim Standard (IS)-95A, Mobile Station-Base Station Compatibility Standard for Dual-Mode Spread Spectrum Cellular Systems, Telecommunications Industry Association, Washington, D. C. Jul. 1993 [IS-95A]. According to these standards, coded communication signals are transmitted in common 1.25 megahertz (MHz) carriers between the base station system (BSS) and mobile communication units that are communicating in the service coverage areas of the BSS.

Another TIA interim standard, Telecommunication Industry Association Interim Standard (IS) IS-634, MSC-BS Interface, Telecommunications Industry Association, Washington, D. C., 1995, provides interface specifications for the generalized architectural framework required to support a typical multiple access wireless communication system such as a digital radio frequency (RF) radiotelephone system. The generalized architectural framework includes multiple base transceiver stations (BTS) in communication with at least one base station controller (BSC). The generalized architectural framework also includes multiple selection distribution units (SDU) and at least one mobile switching center (MSC). The typical multiple access wireless communication system communicates via the MSC to a public switched telephone network (PSTN).

BTSs communicate via an RF channel with mobile communication units operating within their respective coverage areas, via forward (BTS to mobile communication unit) and reverse links (mobile communication unit to BTS). An SDU is coupled to one or more BTSs as well as to a BSC. In general, the SDU performs frame selection on the reverse link from the BTSs, and air interface frame distribution on the forward link to the BTSs. In addition, an inter-working function (IWF) is required for conversion of data signals from an radio link protocol such as set forth in TIAIEIA IS-707, Data Services Option Standard for Wideband Spread Spectrum Systems, Washington, D. C., 1997, to a protocol suitable for processing the data signal by the wireless communication system. The data signal may be either a circuit oriented data signal or a packet oriented data signal.

In a cellular communication system, the forward and reverse communication links are established for transmitting and receiving a signal between a mobile communication unit and a source base transceiver station. The signal may be a voice signal or a data signal. As a mobile communication unit moves out of range of the source base transceiver station, the signal quality degrades until one of the pair of the communication links is ultimately broken, or the call "dropped". To avoid loss of the communication links resulting from a dropped call, the communication links are shifted from the source BTS to a target BTS, or from a source sector to a target sector within the source BTS coverage area. This process of making the shift is commonly referred to in the cellular communication area as a handoff process. A handoff may occur during a call in progress (e.g. from a traffic channel to a traffic channel), or during the initial signaling during call set-up.

Handoffs are generally classified into three types; a soft handoff, a softer handoff and a hard handoff. A soft handoff occurs when a mobile voice or data signal is transferred from a source BTS to a target BTS, the BTSs serving different cell coverage areas. The transfer occurs while the mobile communication unit is in communication with both the source and target BTSs. Similarly, a softer handoff occurs when a mobile voice or data signal is transferred from a source sector to a target sector, both sectors associated with the same base transceiver station. The transfer occurs while the mobile communication unit is in communication with both the source and target sectors. During a soft and softer handoff, the mobile communication signal is supported simultaneously by both the source and target BTSs until the communication signal transfer to the target BTS, is complete. For a voice signal during a hard handoff, the mobile communication unit is directed to re-tune to a new carrier frequency, and/or the control of resources supporting the mobile voice communication signal is transferred from a source SDU to a target SDU. For a data signal during a hard handoff in which the source SDU is communicating with an IWF, control of resources supporting the data signal may not be fully transferred from the source SDU to the target SDU.

Currently, a variety of methods have been proposed for providing hard-handoff capability for CDMA circuit oriented and packet oriented data signals. One method requires keeping data signal calls in a soft/softer handoff as long as possible until either the handoff requirement ceases or the data signal call is dropped via an RF failure. Another method utilizes an intersystem link protocol (ISLP) as set forth in TIA/EIA IS-728, Intersystem Link Protocol, Telecommunications Industry Association, Washington, D. C., July 1997. Utilization of the ISLP method allows data signals to be framed and flagged at a target SDU, and subsequently "tunneled" from the target system to the source IWF via the source system for processing, across the MSC seams if required. When using the proposed ISLP method, the source IWF and source SDU remain engaged for delivery of the circuit oriented data signal to the PSTN despite handoff of all associated RF links from the source system to the target system. Likewise, the source IWF and source SDU remain engaged for delivery of the packet oriented data signal to a public packet data network (PPDN). Additionally, the source SDU is required to perform a conversion of the data signal from the ISLP to a frame relay switched virtual circuit (FR SVC) format for transporting across a mobile data path (MDP) to the source IWF. However, radio link protocol (RLP) termination and selector functions move from the source SDU to the target SDU for both circuit oriented and packet oriented data signals, upon a hard handoff. Therefore, both the source and target SDU are required for a hard handoff using the ISLP method. Specifically, the source SDU is required to continue to perform protocol conversion for processing by the source IWF during the life of the data signal call even after a hard handoff to the target BTS.

Unfortunately, utilizing the ISLP method for providing hard handoff capability for data calls as specified in the IS-634 standard, requires considerable protocol conversion, protocol processing, and resource overhead at the source and target SDU. In addition, the current IS-634 standard is not explicit with respect to the allocation of functionality required for the source and target SDUs during a hard handoff. Also, the IS-634 standard does not define which type of data signal is to be framed and flagged when utilizing the ISLP method. Further, inter-vendor inter-operability issues are likely to arise, thus adversely affecting implementation of hard handoff capability in various multiple access wireless systems due to incompatible architecture/software utilized by the manufacturers of multiple access wireless systems.

Therefore, a need exists for a method for transferring a data signal in a wireless communication system which overcomes the problems inherent with utilizing prior art methods.

DETAILED DESCRIPTION OF THE PREFERRED EMBODIMENT

Stated generally, a method for providing a hard handoff of a CDMA data signal associated with a mobile communication unit between a source and target system in a wireless communication is disclosed. The source system includes a source base transceiver station (BTS), a source BSC (BSC), a source selection distribution unit (SDU) and the inter-working function (IWF), and the target system includes a target BTS, a target BSC, and a target SDU. In addition, the wireless communication system includes a plurality of dedicated circuit links and signaling transport functions. The method requires forwarding parameters associated with the link between the source SDU and the IWF from the source to the target system at the time the source system determines that the handoff is required. The parameters are then used by the target SDU to convert the CDMA data signal to an frame relay switched virtual circuit (FR SVC) stream, suitable for processing by the IWF.

Stated specifically, a method of transferring the CDMA data signal between a source system and a target system in a wireless communication system, is disclosed. The method includes establishing an FR SVC format capability in the source system and, as a consequence, generating a plurality of parameters. The method also includes determining that the mobile station requires a transfer of the CDMA data signal which results in forwarding a message from the source system to the target system to transfer the CDMA data signal from the source system to the target system, the message including the plurality of parameters. Finally, based on the plurality of parameters, the method includes converting the CDMA data signal into a FR SCV format by the target system, forming a frame relay data signal. The frame relay signal is then routed, via the target system to an inter working function element (IWF) of the source system.

Figure 1:
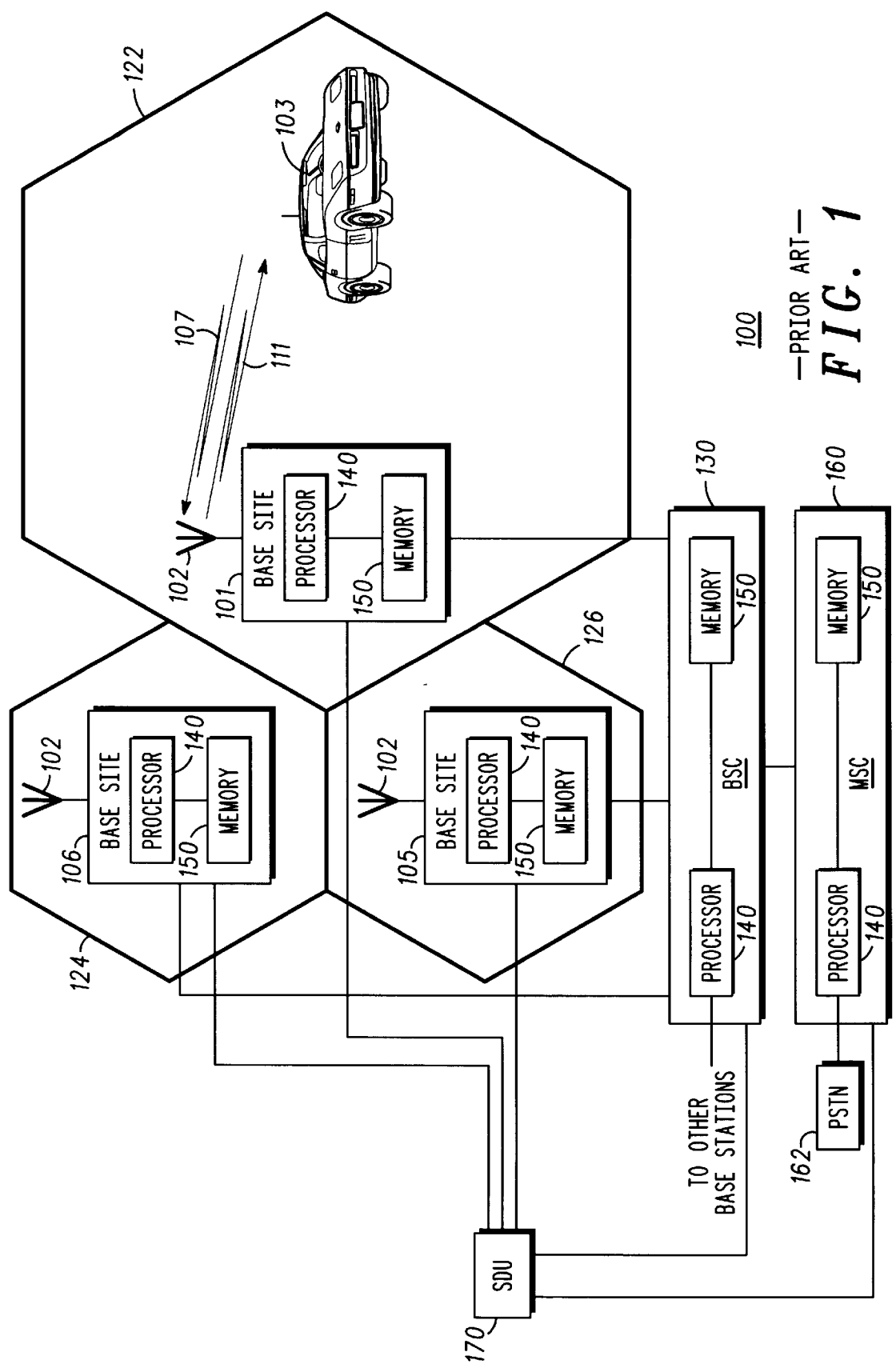
FIG. 1 depicts a typical wireless communication system.

Turning now to the drawings, wherein like numerals designate like components, FIG. 1 depicts a typical prior art wireless communication system 100. Communication system 100 preferably comprises a direct sequence code division multiple access (DS-CDMA) cellular communication system, such as that set forth in TIA IS-95A.

Communication system 100 includes base sites 101, 106, and 105 providing service to coverage areas 122, 124, and 126 respectively, and one or more mobile communication units although only one mobile communication unit 103 is shown. Base sites 101, 105 and 106 include, among other things, an antenna 102, a processor 140 and a memory 150. Base site 101 includes a transceiver which transmits coded communication signals to, and receives coded communication signals from a mobile communication unit 103 within a coverage area 122 of base site 101. A RAKE receiver within the transceiver provides independent tracking capability of incoming multipath coded communication signals including voice or data signals from mobile communication units, the construction and operation of RAKE receivers being well known in the art. Similarly, mobile communication unit 103 includes a transceiver which transmits coded communication signals to, and receives coded communication signals from, base site 101 within a coverage area 122.

Base sites 101, 105, and 106 are coupled to a base station controller (BSC) 130, which includes, among other things, a processor 140 and a memory 150, and which is in turn coupled to a mobile switching center (MSC) 160, also including a processor 140 and a memory 150. Base sites 101, 105, and 106 are also coupled to a selection distribution unit (SDU) 170. SDU 170 is in turn, coupled to BSC 130 and MSC 160. Among other things, the SDU 170 performs a frame selection function on the data/voice signals received via the reverse link and a frame distribution function on the voice/data signals transmitted to the BTSs on the forward link. Further, MSC 160 is coupled to the public switched telephone network (PSTN) 162 using known techniques.

Signals 107 and 111 are conveyed between mobile communication unit 103 and base site 101 via antenna 102, through a pair of radio frequency (RF) links. The pair of RF links includes a reverse link 107 (mobile communication unit 103 to base site 101) and a forward link 111 (base site 101 to mobile communication unit 103). BSC 130 and MSC 160 operate according to well known methods and are commercially available from Motorola, Inc.

Figure 2:
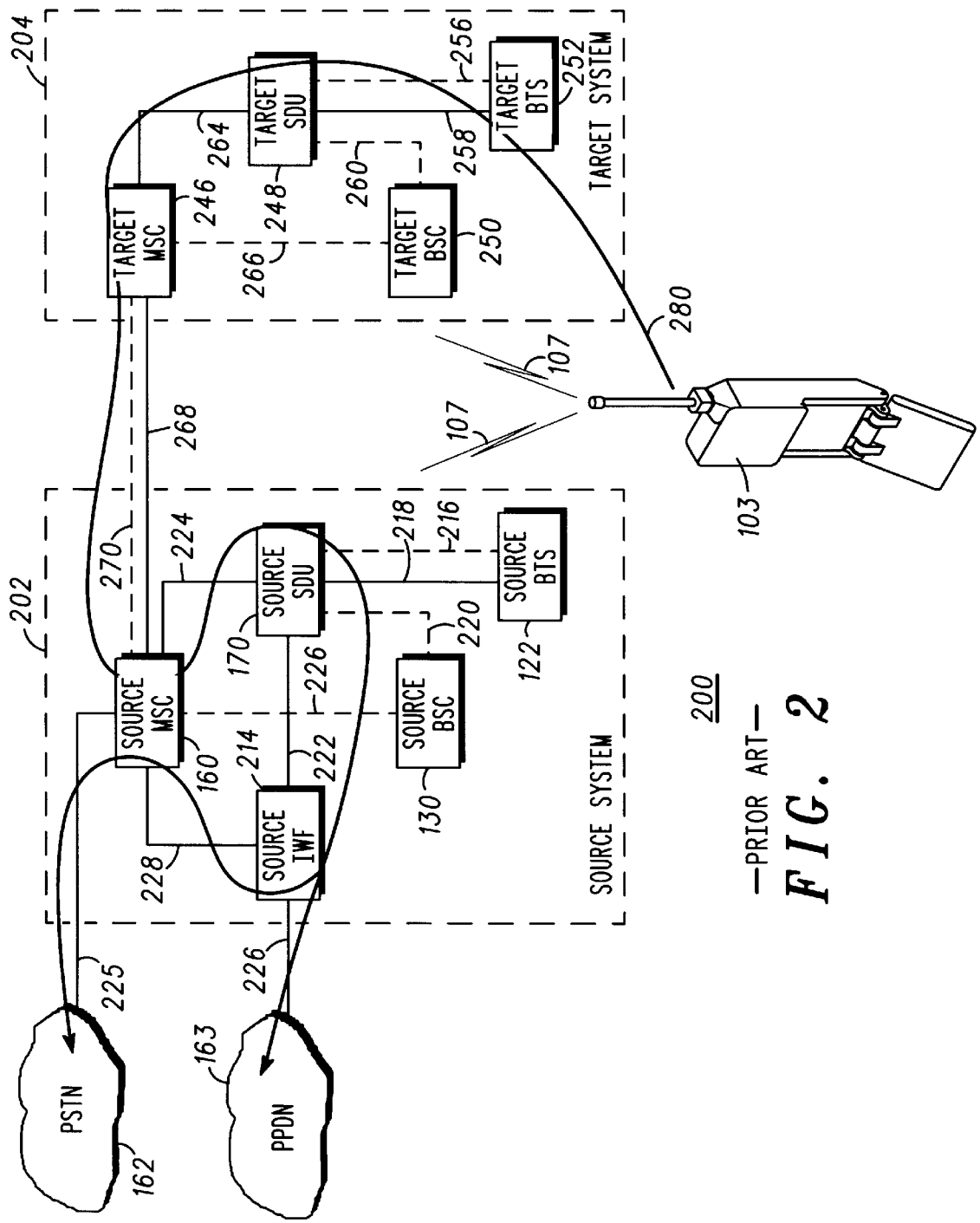
FIG. 2 is a prior art wireless communication system used for transferring a data signal in a wireless communication system.

FIG. 2 is a prior art wireless communication system 200 used for transferring a data signal in a wireless communication system. Wireless communication system 200 includes a source system 202 and a target system 204. As shown, source system 202 includes a source MSC 160, a source SDU 170, a source BSC 130, a source BTS 122, and a source IWF 214. Further, source SDU 170 may include, among other things, a multiplexer (not shown), although the multiplexer may be located elsewhere in wireless communication system 200. Source BSC 130 is coupled to source MSC 160 via a signaling link 226 capable of control message transport capability or carrying signaling messages, specified as A1 message types per IS-634. Source MSC 160 is also coupled to a public switched telephone network (PSTN) 225 using well known techniques. A PPDN 163 for use on an internet packet (IP) network is coupled to source IWF 214 using well known techniques.

Source SDU 170 is coupled to source BTS 122 via a signaling link 216 and a traffic link 218. Signaling link 216 and traffic link 218 constitute an A3 link, as specified in IS-634. The A3 link provides control message and signal transport capability between BTS 122 and SDU 170. In addition, source SDU 170 is in communication with source BSC 130 via a signaling link 220, capable of carrying A4 message types as specified in IS-634, or proprietary control message transport capability. Signaling link 220 may be commonly referred to as an A4 link.

Source SDU 170 communicates with source IWF 214 via a traffic link 222. Traffic link 222 is commonly referred to as the mobile data path (MDP) as specified in TIA/EIA IS-658, Data Services Interworking Function Interface for Wideband Spread Spectrum Systems, Telecommunications Industry Association, Washington, D. C., July 1997. IS-658 sets forth the requirements for the interface(s) between IWF 214 and the other elements of the multiple access wireless communication system. The interfaces, commonly referred to as "L interfaces", have been defined in IS-658. IS-658 describes three components of the L interface, including a signaling link, a mobile data path (MDP) and a PSTN data path (PDP). The first component of the L interface, a signaling link, has been defined to include an interface between IWF 214 and source BSC 130, or an interface between IWF 214 and source MSC 160.

The second component of the L interface, the MDP, defines the interface between source IWF 214 and the multiple access wireless communication system 200, more specifically, between source IWF 214 and source SDU 170. The MDP is typically implemented as one or more permanently provisioned bearer channels. Each bearer channel may consist of either one or more B-channels, or one or more H-channels with unrestricted digital information capability on a T1 facility. In the IS-634 architecture, the MDP is analogous to an A5 link between source IWF 214 and source SDU 170. Therefore, if implemented as one or more B-channels, traffic link 222 constitutes an A5 link, as specified in IS-634. In addition, the multiplexer located in source system 202 enables multiplexing of multiple FR SVCs onto a single bearer channel of the MDP.

The third component of the L interface, the PDP, is used for communicating 64 kilobit pulse code modulation (PCM) signals between source IWF 214 and PSTN 162. The PDP is typically implemented as individual B-channels on one or more T1s, or ISDN primary rate interfaces (PRI). In the IS-634 architecture, the PDP is analogous to the A2 link between source IWF 214 and source MSC 160.

For the transmission of data signals on the forward and reverse RF links, interim standards such as TIA/EIA IS-707 set forth a radio link protocol (RLP). For the conversion of the data signals from RLP to an appropriate PSTN asynchronous data or group 3 facsimile protocol suitable for circuit oriented data signals, an interface working function (IWF) is required. Likewise, for conversion of the data signals from RLP to a stream of datagrams as set forth in ANSI Internet protocol, RFC-791 suitable for packet oriented data signals, an IWF is required. In general terms, the IWF provides data circuit terminating equipment (DCE) functions needed to communicate with the data terminal equipment (DTE) functions provided by the mobile communication unit. For circuit oriented data conversion, the IWF may be implemented as a pool of modems typically interfaced to a MSC via an A2 link described in IS-634. The A2 link may be referred to as a PSTN path or the PDP. For packet oriented data conversion, the IWF may be implemented as a cellular digital packet data mobile data-intermediate system (CDPD MD-IS) or a mobile-IP foreign agent. For packet data conversion, the IWF would typically interface to public packet data network (PPDN) for use on an internet packet (IP) network.

Returning to FIG. 2, source SDU 170 communicates with source MSC 160 via a traffic link 224 capable of transporting IS-634 A2 traffic signals for voice signals and A5 data traffic signals for data signals. When carrying data signals, traffic link 224 provides 64 kilobit per second clear channel data signal transport capability. Source IWF 214 is in communication with source MSC 160 via a traffic link 228 capable of transporting IS-634 A2 traffic signals. The A2 link traffic signal transport capability required to support a communication path between multiple access wireless communication system 200 and PSTN 162. Similarly, IWF 224 is in communication with PPDN 163 via a traffic link 226.

In general, for both circuit oriented and packet oriented data signals, source SDU 170 performs frame selection on the reverse link from source BTS 122, and air interface frame distribution on the forward link to source BTS 122. For example, upon receipt of a voice signal from source BTS 122 via traffic link 218, source SDU 170 performs conversion of the coded voice signal to a pulse code modulation signal (PCM) which is then forwarded to source MSC 160 via traffic link 224.

For data signals received from source BTS 122, source SDU 170 performs reverse protocol conversion of the data signal from an RLP format to a FR SVC format suitable for transmission to source IWF 214 via traffic link 222. In addition, source SDU 170 performs RLP termination, with the peer RLP termination being provided by a mobile communication unit such as mobile communication unit 103. Multiple FR SVCs may be multiplexed over a single bearer channel, depending on the MDP bearer channel capability of traffic link 222 and the data signal transmission rate. Likewise, source SDU 170 performs forward protocol conversion of the data signal from a FR SVC format from the source IWF 214 to an RLP format suitable for mobile communication unit 103.

Source IWF 214 provides data service conversion, including both circuit oriented and packet oriented data conversion, in a CDMA infrastructure such as wireless communication system 200. For circuit oriented data signals received from source SDU 170, source IWF 214 routes the data signal received in a FR SVC format via traffic link 222 through an internal modem (not shown) in source IWF 214, and converts the data signal to PSTN asynchronous data or group 3 facsimile signals, in a pulse code modulation (PCM) format. The PSTN asynchronous data or group 3 facsimile signals are then transmitted over traffic links 228 and 225 to PSTN 162. For circuit oriented data signals received from the PSTN, the internal modem in IWF 214 demodulates the PSTN asynchronous data or group 3 facsimile signals received from source MSC 160. Source IWF 214 then transmits the data signal in a FR SVC format to source SDU 170, via traffic link 222. Source SDU 170 demultiplexes the data signal in a FR SVC format, resulting in the data signal which is then forwarded in an RLP frame format to source BTS 122 via traffic link 218.

For packet oriented data signals, an internal modem function is not required in source IWF 214. For packet oriented data signals received from source SDU 170, source IWF 214 converts the data signal received via FR SVCs over traffic link 222 from source SDU 170, to a format suitable for receipt by a PPDN 163 using well know techniques. For packet oriented data signals received from PPDN 163, source IWF 214 and source SDU provide functions substantially similar to those provided for circuit data signals.

Target system 204 includes a target MSC 246, a target SDU 248, a target BSC 250, and a target BTS 252. Target BSC 250 is coupled to target MSC 246 via a signaling link 266, capable of transporting IS-634 A1 message types.

Target SDU 248 is coupled to target BTS 252 via a signaling link 256 and a traffic link 258. Signaling link 256 and traffic link 258 constitute the A3 type link, as specified in IS-634. Target SDU 248 is in communication with target BSC 250 via a signaling link 260, capable of transporting A4 message types as specified in IS-634, or capable of transporting proprietary message types. Target SDU 248 is in communication with target MSC 246 via a traffic link 264 transporting IS-634 A2 traffic signals for voice signals and A5 traffic signals for data signals. When carrying data signals, traffic link 264 provides 64 kilobit per second clear channel data signal transport capability.

Source system 202 is linked to target system 204 via an MSC interface seam. The MSC interface seam is defined by source MSC 160 coupled to target MSC 246 via a traffic link 268 and a signaling link 270. Messages sent across the MSC seam are capable of carrying messages types specified by the IS-41 interface standard. Traffic link 268 provides 64 kilobit per second bearer channels able to provide unrestricted digital information transport capability. In addition, although a PSTN 162 is shown coupled to source MSC 160, it may also be coupled to target MSC 246.

A mobile communication unit 103 is also shown in FIG. 2. Initially, mobile communication unit 103 transmits a data signal 107 to source system 202 via source BTS 122. Data signal 107 is transmitted to source BTS 122 in an RLP frame format as specified in IS-707. Source BTS 122 forwards data signal 107 to source SDU 170 via traffic link 218. Additional local BTSs receiving data signal 107, forward data signal 107 to source SDU 170 also via their respective A3 traffic links (not shown). Source SDU 170 selects the best incoming RLP frames representative of data signal 107, received via traffic link 218. Source SDU 170 then removes data signal 107 from the best incoming RLP frames representative of data signal 107, and forwards it to source IWF 214 in a FR SVC format for conversion to an appropriate protocol suitable for either circuit oriented data or packet oriented data interfaces, as described above.

As mobile communication unit 103 travels away from source system 202 and towards target system 204, source BSC 130 initiates a hard handoff of data signal 107 from source system 202 to target system 204, using well known handoff messaging scenarios between the elements of wireless communication system 200. Source BSC 130 notifies target BSC 250 via established signaling links such as signaling links 226, 270, and 266 to provide resources and enable the hard handoff of data signal 107.

In an attempt to provide hard handoff capability for CDMA data calls, various solutions have been proposed. One solution proposed requires that data signal 107 be kept in a soft handoff for as long as possible by source BSC 130, since the established traffic link between IWF 214 and the source MSC cannot be switched during the life of the call. Obviously, this solution is not practical since the call would eventually drop as mobile communication unit 103 traveled out of the coverage area served by source system 202.

Another proposed solution requires the use of the intersystem link protocol (ISLP), IS-728 in order to "tunnel" a data payload resulting from data signal 107. The data payload representative of data signal 107 is tunneled between target system 204 and source system 202 across the MSC seams. This ISLP solution requires framing the bits of the received data signal 107 as described in IS-728, and transporting them via traffic links 264, 268 and 224, from target SDU 248, across the MSC seam to source SDU 170. Source SDU 170 then must convert the ISLP data stream representative of data signal 107 into a format such as FR SVC suitable for further conversion at source IWF 214. Therefore, two SDUs, SDU 170 and 248, with three types of SDU capabilities including 1) a source SDU for converting a data signal not in hard handoff, 2) a source SDU for converting the data signal in hard handoff, and 3) a target SDU for converting the data signal in a hard handoff to conform to the ISLP solution, are required in order to implement the ISLP hard handoff solution. Consequently, the ISLP solution requires excessive protocol conversion and resource overhead. A data path 280 overlaid on wireless communication system 200 depicts the course which data signal 107 must traverse after a hard handoff from source system 202 to target system 204 to PSTN 162, or to PPDN 163.

Figure 3:
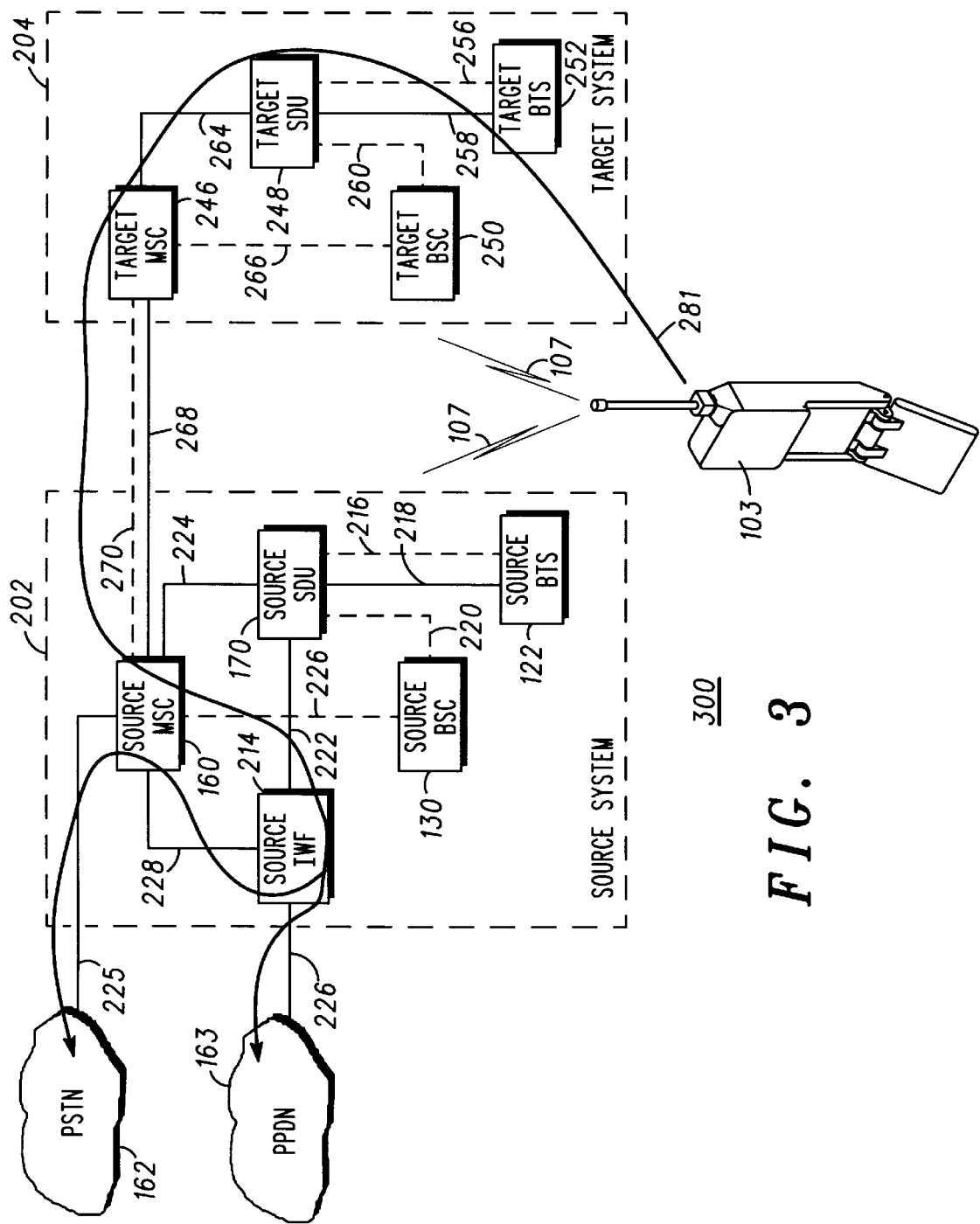
FIG. 3 is a wireless communication system as shown in FIG. 2, further illustrating a method and apparatus for transferring a data signal in a wireless communication system according to a preferred embodiment of the present invention.

FIG. 3 is a wireless communication system as shown in FIG. 2, further illustrating a method and apparatus for transferring a data signal in a wireless communication system according to a preferred embodiment of the present invention. Although the architecture of source system 202 and target system 204 are identical to the architecture shown in FIG. 2, the preferred embodiment requires a change to the functionality of source SDU 170 and target SDU 248. The preferred embodiment also requires additional information to be added to the handoff required message which is initially sent from source BSC 130 to source MSC 160 when the mobile communication unit 103 travels away from the coverage area served by source system 202. Thus the change in SDU functionality coupled with the information added to the handoff required message eliminates the need for source SDU 170 to be in the data signal path after a successful hard handoff of data signal 107 to target system 204.

Elimination of the need for source SDU 170 to continue to participate in the data signal conversion from an RLP format to an FR SC format after a successful hard handoff is generally accomplished as follows. First, a set of FR SVC parameters resulting from the establishment of the initial link between source SDU 170 and source IWF 214, is saved at source BSC 130. The FR SVC parameters which include for example, a data link identifier, transit delays maximum frame relay information sizes, and throughput, are subsequently forwarded in the handoff required message. Second, based on the set of received FR SVC parameters, target SDU 248 converts incoming data signal 107 to the FR SVC protocol suitable for conversion by source IWF 214, thus eliminating the need for protocol conversion by source SDU 170.

A data path 281 overlaid on wireless communication system 300 depicts the course which data signal 107 must traverse after a hard handoff from source system 202 to target system 204 to PSTN 162, or PPDN 163, according to the preferred embodiment of the present invention.

Figure 4:
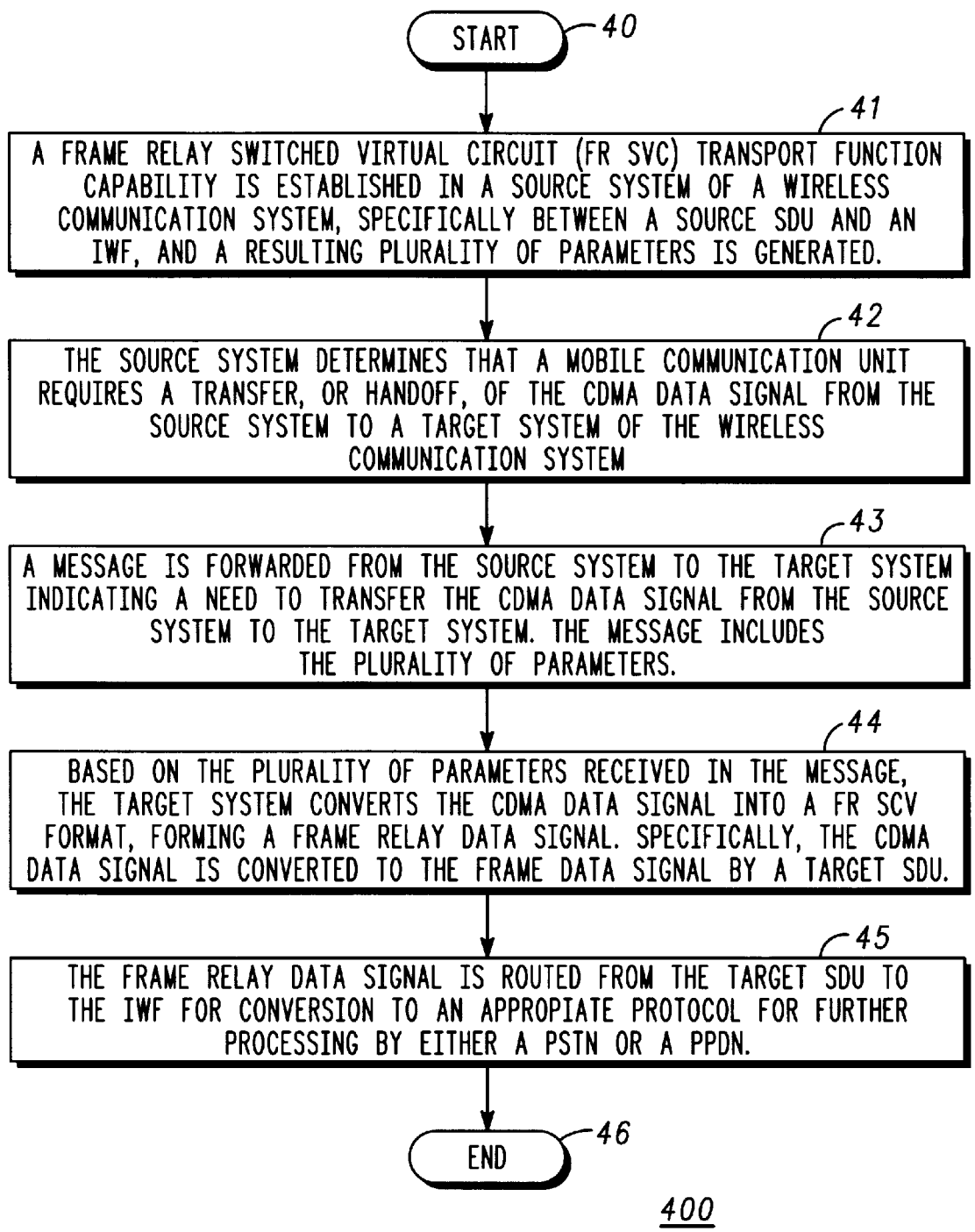
FIG. 4 is a flow chart of a method for transferring a data signal in a wireless communication system according to a preferred embodiment of the present invention.

FIG. 4 is a flow chart of a method for transferring a data signal in a wireless communication system according to a preferred embodiment of the present invention. The wireless communication system includes a source and target system. The source system includes a source base transceiver station (BTS), a source BSC, a source selection distribution unit (SDU) and the inter-working function (IWF), and the target system includes a target BTS, a target BSC, and a target SDU. In addition, the wireless communication system includes a plurality of dedicated circuit links and signaling transport functions.

Method 400 starts at step 41, where a frame relay switched virtual circuit (FR SVC) transport function capability is established in the source system, specifically between the source SDU and the IWF, and a resulting plurality of parameters is generated. The plurality of parameters may be saved by the source system. The CDMA data signal is then routed from the mobile communication unit to the IWF via an RF traffic channel to the source BTS, and from the source BTS to the source SDU via a dedicated terrestrial circuit link, and from the source SDU to the IWF via the FR SVC transport function capability. The CDMA data signal is converted to a suitable format at the IWF and the routed from the IWF to the source MSC if the CDMA data signal is in the circuit oriented data format. If the CDMA signal is in a packet oriented data format, it is converted by the IWF to a suitable format for routing to a PPDN.

Next at step 42, the source system determines that the mobile communication unit requires a transfer, or handoff, of the CDMA data signal from the source system to the target system.

A message is forwarded from the source system to the target system indicating the need to transfer the CDMA data signal from the source system to the target system, at step 43. The message includes the plurality of parameters. The message which may be, for example, a handoff required message is forwarded from the source BSC to the source MSC informing the source MSC that a handoff of the CDMA data signal from the source system to the target system is required. The handoff required message is repackaged as a facility directive 2 invoke message at the source MSC and then forwarded to the target MSC informing the target MSC that the handoff of the CDMA data signal from the source system to the target system is required. The target MSC selects a dedicated terrestrial circuit link between the target SDU and the target MSC, and forwards a handoff request message to the target BSC, informing the target BSC that the handoff of the CDMA data signal from the source system to the target system is required. The handoff request message includes the plurality of parameters as well as the identity of the dedicated terrestrial circuit link between the target SDU and the target MSC. The handoff request message is repackaged as an information message at the target BSC and forwarded to the target SDU, informing the target SDU of an establishment of the FR SVC transport function capability in the source system. The repackaged message to target SDU 248 includes the plurality of FR SVC parameters. The target BSC then selects a target RF traffic channel between the mobile communication unit and the target BTS, and a dedicated terrestrial circuit link between the target BTS and the target SDU, for subsequent routing of the CDMA data signal. Finally, the target system acknowledges resource allocation to the source system via a reverse series of messages, and the source BSC instructs the mobile communication unit to acquire the target RF traffic channel.

At step 44, based on the plurality of parameters received in the message, the target system converts the CDMA data signal into a FR SCV format, forming a frame relay data signal. Specifically, the CDMA data signal is converted to the frame relay data signal by the target SDU, therefore eliminating a need for the source SDU to provide the conversion. Finally, the frame relay data signal is routed from the target SDU to the IWF for conversion to an appropriate protocol for further processing, at step 45.

It will be apparent that other forms of the invention, and embodiments other than the specific embodiments described above, may be devised without departing from the spirit and scope of the appended claims and their equivalents.

We claim:

1. A method for transferring a CDMA data signal associated with a mobile communication unit from a source system to a target system, the method comprising:

establishing a frame relay switched virtual circuit (FR SVC) transport function capability in the source system, and generating a plurality of parameters related thereto;

determining, by the source system, that the mobile communication unit requires a transfer of the CDMA data signal from the source system to the target system;

forwarding a message from the source system to the target system to transfer the CDMA data signal from the source system to the target system, the message comprising the plurality of parameters;

converting, based on the plurality of parameters, the CDMA data signal into a FR SCV format by the target system, forming a frame relay data signal; and routing the frame relay data signal to an inter working function element (IWF) of the source system via the target system.

2. The method according to claim 1, wherein the source system comprises a source base transceiver station (BTS), a source BSC (BSC), a source selection distribution unit (SDU) and the inter-working function (IWF), and the target system comprises a target BTS, a target BSC, a target mobile switching center (MSC) and a target SDU.

3. The method according to claim 2, further comprising establishing a plurality of dedicated circuit links and signaling transport functions in the source and target systems.

4. The method according to claim 3, wherein the step of establishing a plurality of dedicated circuit links and signaling transport functions in the source and targets system comprise the steps of:

establishing at least one dedicated terrestrial circuit between the source SDU and a source mobile switching center (MSC) associated with the source system;

establishing at least one dedicated terrestrial circuit between the source SDU and the source BTS;

establishing at least one dedicated terrestrial circuit between the IWF and the source MSC if the CDMA data signal is in a circuit oriented format;

establishing at least one dedicated connection between the IWF and a public packet data network (PPDN) if the CDMA data signal is in a packet oriented format;

establishing at least one bearer channel between the IWF and the source SDU;

establishing at least one dedicated terrestrial circuit between the source MSC and the target MSC;

establishing at least one dedicated terrestrial circuit between the target SDU and the target MSC; and establishing at least one dedicated terrestrial circuit between the target BTS and the target SDU.

5. The method according to claim 4, wherein the step of establishing a plurality of dedicated circuit links and signaling transport functions in the source and target systems further comprise the steps of:

establishing an IS-41 signaling transport functions between the source MSC and a target MSC associated with the target system;

establishing an IS-634 A1 signaling capability between the source BSC and the source MSC, and between the target BSC and the target SDU;

establishing an IS-634 A4 signaling capability between the source BSC and the source SDU, and between the target BSC and the target SDU;

establishing an IS-634 A3 signaling capability between the source SDU and the source BTS, and between the target SDU and the target BTS; and establishing an IS-658 signaling capability between the IWF and the source MSC.

6. The method according to claim 5, wherein the step of establishing a plurality of dedicated circuit links and signaling capability functions in the wireless communication system further comprises the step of establishing an IS-658 signaling capability between the IWF and the source BSC.

7. The method according to claim 5, further comprising the step of establishing the CDMA data signal between the mobile communication unit and the source system.

8. The method according to claim 7, further comprising the step of:

selecting, by the source system, an RF traffic channel between the mobile communication unit and the source BTS, and the at least one dedicated terrestrial circuit between the source BTS and the source SDU, for subsequent routing of the CDMA data signal.

9. The method according to claim 5, wherein establishing the FR SVC transport function capability in the source system comprises the step of implementing the FR SVC transport function capability between the source SDU and the IWF.

10. The method according to claim 5, further comprising the steps of:

routing the CDMA data signal from the mobile communication unit to the IWF via the RF traffic channel to the source BTS, from the source BTS to the source SDU via the at least one dedicated terrestrial circuit link, and from the source SDU to the IWF via the FR SVC transport function capability;

routing the CDMA data signal from the IWF to the source MSC via the at least one dedicated terrestrial circuit link between the IWF and the source MSC if the CDMA data signal is in a circuit oriented format; and routing the CDMA data signal from the IWF to the PPDN via the at least one dedicated connection between the IWF and the PPDN if the CDMA data signal is in a packet oriented format.

11. The method according to claim 5, wherein the step of forwarding the message from the source system to the target system comprises the steps of:

forwarding a handoff required message from the source BSC to the source MSC informing the source MSC that a handoff of the CDMA data signal from the source system to the target system is required, the handoff required message including the plurality of parameters;

forwarding a facility directive 2 invoke message from the source MSC to the target MSC informing the target MSC that the handoff of the CDMA data signal from the source system to the target system is required;

selecting, by the target MSC, the at least one dedicated terrestrial circuit link between the target SDU and the target MSC;

forwarding a handoff request message from the target MSC to the target BSC, informing the target BSC that the handoff of the CDMA data signal from the source system to the target system is required, the handoff request message including the plurality of parameters and an identity of the at least one dedicated terrestrial circuit link between the target SDU and the target MSC;

forwarding an information message including the plurality of parameters from the target BSC to the target SDU, the information message informing the target SDU of an establishment of the FR SVC transport function capability in the source system; and selecting, by the target system, an RF traffic channel between the mobile communication unit and the target BTS, and the at least one dedicated terrestrial circuit link between the target BTS and the target SDU, for subsequent routing of the CDMA data signal.

12. The method according to claim 11, wherein the step of forwarding a message from the source system to the target system further comprises the steps of:

forwarding a handoff request acknowledgment message from the target BSC, the handoff request acknowledgment message comprising a resource allocation of the target BTS;

selecting, by the target MSC, the at least one dedicated terrestrial circuit link between the source MSC and the target MSC, forming an inter-MSC terrestrial circuit for subsequent routing of the CDMA data signal via the target system;

forwarding a facility directive 2 result message from the target MSC, the facility directive 2 result message comprising the resource allocation of the target BTS and a resource allocation of the inter-MSC terrestrial circuit;

selecting, by the source MSC, the at least one dedicated terrestrial circuit between the source MSC and the source SDU;

forwarding a handoff command message from the source MSC, the handoff command message comprising the resource allocation of the target BTS and a resource allocation of the terrestrial circuit between the source MSC and the source SDU;

instructing, by the source BSC, the mobile communication unit to acquire a target RF traffic channel identified by the resource allocation of the target BTS; and notifying the source MSC of a transition of the CDMA data signal from the source BTS to the target BTS, via a handoff commenced message from the source BSC.

13. The method according to claim 2, the step of converting the CDMA data signal to the FR SCV format further comprises the steps of:

enabling a conversion by the target SDU, of the CDMA data signal from a radio link protocol to a frame relay data signal suitable for processing by the IWF;

disabling a conversion by the source SDU, of the CDMA data signal from the radio link protocol format to the frame relay data signal; and providing a multiplexing capability at the source system to multiplex the frame relay data signal with a plurality of frame relay data signals resulting from a plurality of additional CDMA data signals.

14. The method according to claim 13, wherein the step of routing the frame relay data signal to the IWF via the target system comprises the steps of:

notifying the target MSC of the transition of the CDMA data signal from the source BTS to the target BTS via a handoff complete message from the target BSC;

notifying the source MSC of the transition of the CDMA data signal from the source system to the target system via a mobile station on channel message from the target MSC;

routing the CDMA data signal through the target RF traffic channel, and the at least one dedicated terrestrial circuit between the target BTS and the target SDU;

converting the CDMA data signal to the frame relay data signal by the target SDU; and routing the frame relay data signal through the at least one dedicated terrestrial circuit between the target SDU and the target MSC, the inter-MSC terrestrial circuit between the target MSC and the source MSC, the at least one dedicated terrestrial circuit between the source MSC and the source SDU, and the at least one bearer channel between the source SDU and the IWF.

15. The method according to claim 2, wherein the frame relay data signal comprises an FR SVC stream.

16. A method for completing a hard handoff of a CDMA data signal associated with a mobile communication unit in a wireless communication system from a source system comprising a source base transceiver station (BTS), a source base station controller (BSC), a source mobile switching center (MSC) a source selection distribution unit (SDU) and an inter-working function (IWF), to a target system comprising a target BTS, a target BSC, a target MSC and a target SDU, the method comprising:

establishing a plurality of dedicated circuit links and signaling transport functions in the wireless communication system;

establishing a code division multiple access (CDMA) data signal between the mobile communication unit and the source BTS via one of the plurality of signaling transport functions;

implementing a frame relay switched virtual circuit (FR SVC) transport function capability between the source SDU and the IWF, enabling conversion of the CDMA data signal associated with the mobile communication unit to a FR SVC stream suitable for processing by the IWF, and enabling multiplexing of a plurality of FR SCV streams by the source system;

saving a plurality of parameters by the source system, the plurality of parameters resulting from implementation of the FR SVC transport function capability;

routing the CDMA data signal associated with the mobile communication unit to the IWF via the source SDU;

determining, by the source BSC, that the mobile communication unit is traveling in a coverage area served by the target BSC;

forwarding a handoff required message from the source system to the target system to enable a hard handoff of the CDMA data signal from the source system to the target system, the handoff required message including the plurality of parameters; and routing the CDMA data signal associated with the mobile communication signal to the IWF via the target SDU, enabling conversion of the CDMA data signal associated with the mobile communication unit to the FR SVC stream suitable for processing by the IWF.

17. The method according to claim 16, wherein the step of routing the CDMA signal to the IWF via the source SDU comprises the steps of:

routing the CDMA data signal from the mobile communication to the source BTS via an RF traffic channel between the mobile communication unit and the source BTS, and from the source BTS to the source SDU via a dedicated terrestrial circuit between the source BTS and the source SDU;

converting, by the source SDU, the CDMA data signal to the FR SVC stream suitable for processing by the IWF;

routing the FR SVC data stream to the IWF;

routing the FR SVC data stream between the IWF and the source MSC via a dedicated terrestrial circuit between the IWF and the source MSC, if the CDMA data signal is in the circuit oriented format; and routing the FR SVC data stream between the IWF and the PPDN via a dedicated connection between the IWF and the PPDN, if the CDMA data signal is in the packet oriented format.

18. The method according to claim 17, wherein the step of forwarding the handoff required message from the source system to the target system, further comprises the steps of:

forwarding the handoff required message from the source BSC to the source MSC informing the source MSC that a handoff of the CDMA data signal from the source system to the target system is required, the handoff required message including the plurality of parameters;

forwarding a facility directive 2 invoke message from the source MSC to the target MSC informing the target MSC that the handoff of the CDMA data signal from the source system to the target system is required;

forwarding a handoff request message from the target MSC to the target BSC, informing the target BSC that the handoff of the CDMA data signal from the source system to the target system is required, the handoff request message including the plurality of parameters and an identity of the at least one dedicated terrestrial circuit link between the target SDU and the target MSC;

forwarding an information message including the plurality of parameters from the target BSC to the target SDU, the information message informing the target SDU of an establishment of the FR SVC transport function capability in the source system;

forwarding a handoff request acknowledgment message from the target BSC, the handoff request acknowledgment message comprising a resource allocation of the target BTS;

forwarding a facility directive 2 request result message from the target MSC, the facility directive 2 request result message comprising the resource allocation of the target BTS and a resource allocation of the inter-MSC terrestrial circuit;

forwarding a handoff command message from the source MSC, the handoff command message comprising the resource allocation of the target BTS and a resource allocation of a terrestrial circuit between the source MSC and the source SDU;

instructing, by the source BSC, the mobile communication unit to acquire a target RF traffic channel identified by the resource allocation of the target BTS; and notifying the source MSC of a transition of the CDMA data signal from the source BTS to the target BTS, via a handoff commenced message from the source BSC.

19. The method according to claim 16, further comprising the steps of, wherein prior to the step of routing the CDMA data signal associated with the mobile communication unit to the IWF via the target SDU, enabling a conversion by the target SDU, of the CDMA data signal from a RLP format to the FR SVC stream suitable for processing by the IWF;

disabling a conversion by the source SDU, of the CDMA data signal from the RLP format to the FR SVC stream; and providing a multiplexing capability at the source system to multiplex the frame relay data signal with a plurality of frame relay data signals resulting from a plurality of additional CDMA data signals.

20. The method according to claim 19, wherein the step of routing the CDMA data signal associated with the mobile communication signal to the IWF via the target SDU comprises the steps of:

notifying the target MSC of a transition of the CDMA data signal from the source BTS to the target BTS via a handoff complete message from the target BSC;

notifying the source MSC of the transition of the CDMA data signal from the source BTS to the target BTS via a mobile station on channel message from the target MSC;

routing the CDMA data signal through the target RF traffic channel, and a dedicated terrestrial circuit between the target BTS and the target SDU;

converting the CDMA data signal to the FR SVC stream by the target SDU; and routing the FR SVC stream through a dedicated terrestrial circuit between the target SDU and the target MSC, an inter-MSC terrestrial circuit between the target MSC and the source MSC, a dedicated terrestrial circuit between the source MSC and the source SDU, and a bearer channel between the source SDU and the IWF.

* * * * *